United States Patent [19]

Kawamoto

[11] Patent Number: 4,655,931
[45] Date of Patent: Apr. 7, 1987

[54] WASTE WATER TREATING AGENT AND METHOD FOR PRODUCING THE SAME

[76] Inventor: Joji Kawamoto, 5-1, 2-chome, Kotobuki-cho, Naka-ku, Yokohama-shi, Kanagawa-ken, Japan

[21] Appl. No.: 736,925

[22] Filed: May 21, 1985

[30] Foreign Application Priority Data

Apr. 18, 1985 [JP]  Japan .................................. 60-81332

[51] Int. Cl.$^4$ ...................... B01D 15/00; B01J 20/12; C02F 1/28
[52] U.S. Cl. .................... 210/679; 210/634; 210/643; 252/88; 252/90; 252/91; 252/175; 252/176; 252/181; 252/306; 252/310; 252/311; 252/312; 252/313.1; 428/403; 428/404
[58] Field of Search ..................... 252/88, 90, 91, 175, 252/176, 181, 306, 310, 311, 312, 313.1; 428/403, 404; 210/634, 643, 679

[56] References Cited

U.S. PATENT DOCUMENTS

| | | | |
|---|---|---|---|
| 1,230,599 | 6/1917 | Petroff | 252/312 |
| 1,374,755 | 4/1921 | Murphy | 252/312 |
| 2,684,949 | 7/1954 | McMillan et al. | 252/314 |
| 3,042,540 | 7/1962 | Cabot | 252/313.1 |

FOREIGN PATENT DOCUMENTS 57-6993  2/1982  Japan .

*Primary Examiner*—Robert A. Wax
*Attorney, Agent, or Firm*—Armstrong, Nikaido, Marmelstein & Kubovcik

[57] ABSTRACT

In case where a surface active agent is contained in waste water, it is extremely difficult to remove the surface active agent, and the present invention has previously found that the surface active agent is oriented and adsorbed in the periphery of colloidal particles, by making use of the fact that an association property exhibits when a concentration exceeds a micel concentration, whereby the periphery of the particles are partly made to increase the concentration to a level above the micel concentration to adsorb and remove the surface active agent in the waste water. The treating agent for that purpose is produced by emulsifying oil, montmorillonite and the like and adsorbing soda of fatty acid or potash salt thereto.

8 Claims, No Drawings

WASTE WATER TREATING AGENT AND METHOD FOR PRODUCING THE SAME

BACKGROUND OF THE INVENTION

1. Filed of the Invention

This invention relates to a waste water treating agent, and more particularly to a waste water treating agent for adsorbing a detergent or a high molecular material having a hydroxyl group while the waste water is in a drain.

2. Description of the Prior Art

Recently, the standards of release for various materials contained in industrial drains have been established in terms of pollution prevention. There is now an obiligation that surface active agents such as detergents and a high molecular materials havig a hydroxyl group be maintained at a level below a predetermined concentration since they have a high COD load.

Methods for removing these surface active agents heretofore known include a foam separation method by aeration treatment, an aggregation treatment method, an electrolysis treatment method, an active carbon adsorption method and the like.

However, these methods have not yet satisfactorily achieved effects as desired. For example, even in the foam separation method which has been considered to be the best method among these methods, the removing efficiency deteriorates as the concentration of the surface active agent in the drain lowers and even if aeration time is extended, removal thereof to the release standard value is impossible.

In the aggregation treatment method which is another method for waste water treatment, it is said that the treatment involves a difficulty since the affinity of the surface active agent with respect to water is great and the dispersion force is also great. In addition, most of components comprise a compound of which raw material is a cracked product resulting from petroleum or the like, and therefore, even when there is microbial treatment, which is a further drain treatment, biological decomposition is often impossible and thus fails to perform treatment.

In view of the foregoing, at present, a possible practical treating method now contemplated is a method which dilutes a drain containing a surface active agent with another drain which contains the surface active agent or which contains it but has a lower concentration.

In view of the foregoing, the present inventor has noticed that as the surface active agent in the drain reaches the micel concentration, the association property is exhibited. He has found a device which comprises binding surface active materials in the periphery of a nucleus of oil or the like, adding colloidal particles wherein the periphery of the nucleus is made to have the micel concentration into waste water, allowing the surface active agent in the waste water adsorb in the colloidal particles, thereby removing the same by the aggregation treating method heretofore considered to be impossible and thus purifying water in the waste water. (Japanese Patent Publication No. 57-6993).

SUMMARY OF THE INVENTION

This invention is intended to provide a waste water treating agent for adding, into waste water, colloidal particles in which the periphery of the nucleus is made to have a micel concentration which is used to remove the surface active agent by the aggregation treating method as described, and a suitable method for producing the same.

In the present invention, an inorganic material such as montmorillonite may be used as the nucleus. Also, kerosene, or an organic material may be used as a nucleus. When oil comprises a nucleus, 0.2 to 0.35 kg of stearic acid and 0.1 to 0.2 kg of myristic acid for one liter of oil are added and dissolved. When an inorganic material comprises a nucleus, 0.3 to 0.5 kg of stearic acid for 1 kg of nucleus is dissolved into oil and mixed, to which is added 0.06 to 018 kg of caustic soda or caustic potash in the form of a solid for heating and reaction thereof to obtain a waste water treating agent as desired.

In accordance with the above-described process, stearic acid and myristic acid are used as an emulsifier to emulsify oil, caustic soda or caustic potash is added and heated to thereby form fatty acid into sodium or potassium salt, anion surface active surface material of fatty acid is oriented and adsorbed in the surfaces of oil particles formed into colloidal form by emulsion and or inorganic particles, and the periphery of the colloidal particles partly assumes a level above the micel concentration.

DETAILED DESCRIPTION OF THE PREFERRED EMBODIMENT

EXAMPLE 1

Kerosene is used as a nucleus of colloid, and 1.7 kg of stearic acid and 1.0 kg of myristic acid for 7 liters of kerosene are aded and agitated for dissolution. After they have been completely dissolved, 0.7 kg of caustic soda is added and heated to approximately 80 degrees for reaction. After termination of reaction, they are dissolved into water for use as a treating agent.

Thus obtained treating agent is white in color and forms an emulsion with kerosene as a nucleus.

EXAMPLE 2

As an example wherein an inorganic material is used as a nucleus, montmorillonite is used. 6 kg of montmorillonite is charged into a liquid wherein 2.5 kg of stearic acid is dissolved into 3.5 liters of kerosene. They are sufficiently (about 15 minutes) agitated by an agitator and thereafter heated, and then they are allowed to stand about 15 minutes at 80 degrees. Then, 1.0 kg of caustic soda is added, agitated and dissolved.

After termination of reaction, they are dissolved into water for use as a treating agent. The thus obtained treating agent is dark grey and forms an emulsion with a mixture of montmorillonite and kerosene as a nucleus.

EXAMPLE 3

0.38 kg of caustic potash is used in place of caustic soda used in Example 1, and the properties thereof are the same as those shown in Example 1.

The optimum composition of the treating agent slightly varies depending on the kind, amount and the like of surface active agent contained in the waste water but compounds representative of average removing degrees are illustrated in the above-described examples.

EFFECTS OF THE INVENTION

The waste water treating agent according to the present invention may be produced at less cost by a simple process wherein fatty acid is dissolved into oil or inorganic material as a nucleus, to which caustic soda in the form of a solid is added for reaction. The surface active agent in waste water is present in the atmosphere of the treating agent which is added into the waste water and agitated. The surface active agent is adsorbed in the colloidal particles of the treating material by the association force. Most of the surface active agent in the waste water is adsorbed and removed by suitably selecting the mixing and agitating time.

Furthermore, since the removing function is carried out by the association force of the surface active material, there is an effect that all the surface active agent may be removed irrespective of kind thereof, namely, anion, cation, nonion, and resisting ion. One example of the treating results of Example 1 is given below:

| Sample (Trademark) | Nonion surface active agent | | |
|---|---|---|---|
| | Raw Water Weight conc. | Treating water Weight conc. | Removing degree % |
| OSPOL 790 | 100 ppm | 12 ppm | 88 |
| TRIPOL RC* | 100 ppm | 10 ppm | 90 |
| RIPOTOL TG 100* | 100 ppm | 15 ppm | 85 |
| | Anion surface active agent | | |
| Sample | Raw Water Weight conc. | Treating water Weight conc. | Removing degree % |
| ABS (alkylbenzene sulphonate) | 14 ppm | 1.0 ppm | 92.8 |

*nonionic product of Tokiwa Chemical Industries, Ltd., Japan.

The result obtained from Example 2 is as follows:

| Sample (Trademark) | Raw water Weight conc. | Treating water Weight conc. | Removing degree % |
|---|---|---|---|
| OSPOL 790 | 100 ppm | 9 ppm | 91 |
| TRIPOL RC | 100 ppm | 18 ppm | 82 |
| RIPOTOL TG 100 | 100 ppm | 12 ppm | 88 |
| | Anion surface active agent | | |
| | Raw Water Weight conc. | Treating water Weight conc. | Removing degree % |
| ABS | 14 ppm | 0.6 ppm | 95.7 |

What is claimed is:

1. A waste water treating agent comprising a nucleus of colloidal particles of monmorillonite, and sodium or potassium salts of fatty acids oriented and adsorbed on the periphery of said colloidal particles.

2. The waste water treating agent as defined in claim 1, wherein colloidal particles of montmorillonite are used as a nucleus, and sodium stearate is oriented and adsorbed in the periphery of said particles.

3. A method for producing a waste water treating agent, comprising mixing and dissolving fatty acid containing 0.2 to 0.5 kg of stearic acid and 1 kg of montmorillonite as a nucleus into a liquid, and adding 0.06 to 0.18 kg of caustic soda or caustic potash in the form of a solid thereto for heating and reaction.

4. The method for producing a waste water treating agent as defined in claim 3 further comprising charging said montmorillonite into the liquid in which 0.3 to 0.5 kg of stearin and 0.5 to 0.7 kg of kerosene for 1 kg of montmorillonite are dissolved, and adding 0.15 to 0.18 kg of caustic soda in the form of a solid thereto for heating and reaction.

5. A method of treating waste water comprising:
   (a) adding to waste water a waste water treating agent formed from a nucleus of colloidal particles of montmorillonite with sodium or potassium salts of fatty acids oriented and adsorbed on the periphery of the colloidal particles,
   (b) agitating the waste water and waste water treating agent mixture for a sufficient time in order to allow any surface active agents present in the waste water to be adsorbed in the colloidal particles by association force, and thereby
   (c) removing the surface active agent from the waste water.

6. The method of treating the waste water of claim 5, wherein the fatty acids are stearic acid and myristic acid.

7. The method of treating the water water of claim 5, wherein the fatty acids are stearic acid and myristic acid.

8. The method of treating the waste water of claim 5, wherein the fatty acids are stearic acid and myristic acid.

* * * * *